United States Patent [19]

Karagiannis et al.

[11] Patent Number: 5,482,767
[45] Date of Patent: Jan. 9, 1996

[54] LIGHT-TRANSMITTING LAMINATED PANEL AND METHOD OF IMPROVING ITS IMPACT RESISTANCE

[75] Inventors: Aristotelis Karagiannis, Northampton; Peter D. LaPorte, South Hadley, both of Mass.

[73] Assignee: Monsanto Company, St. Louis, Mo.

[21] Appl. No.: 324,181

[22] Filed: Sep. 29, 1994

[63] Continuation in part of PCT/US93/08858, Jan. 26, 1994.

[51] Int. Cl.$^6$ .................. B32B 5/16; B32B 17/10
[52] U.S. Cl. .................. 428/327; 156/99; 156/106; 428/436; 428/437; 428/524
[58] Field of Search .................. 428/323, 327, 428/436, 437, 524; 156/99, 106

[56] References Cited

U.S. PATENT DOCUMENTS 4,180,620 12/1979 Inskip .................. 428/524
4,654,179 3/1987 Cartier et al. .................. 264/176.1
5,246,764 9/1993 LaPorte et al. .................. 428/195

Primary Examiner—D. S. Nakarani
Attorney, Agent, or Firm—Michael J. Murphy; Mark F. Wachter

[57] ABSTRACT

A light-transmitting laminated panel having increased resistance to impact-induced rupture sequentially includes: a) a glass layer, b) an optically clear layer of a plasticized polyvinyl butyral matrix containing discrete particles of crosslinked polyvinyl butyral integrally randomly dispersed throughout the matrix which enhance the impact-resistance of the panel and are visually indistinguishable from the matrix polyvinyl butyral, and c) another glass layer, the laminated panel at a specific pummel adhesion having greater mean break height than that of a laminated panel containing layers a), b) and c) but without the impact-resistance-enhancing particles of crosslinked polyvinyl butyral in layer b). An amount up to 40 weight % of the particles is incorporated into the matrix polyvinyl butyral before preparing the laminated panel.

10 Claims, 1 Drawing Sheet

LIGHT-TRANSMITTING LAMINATED PANEL AND METHOD OF IMPROVING ITS IMPACT RESISTANCE

BACKGROUND OF THE INVENTION

This application is a continuation-in-part of copending PCT application Ser. No. PCT/US 93/08859, filed Jan. 26, 1994 which is hereby incorporated by reference.

This invention relates to light-transmitting laminated panels and more particularly to such panels of glass and polyvinyl butyral (PVB) having increased resistance to impact-induced rupture and to a method of increasing such resistance to rupture.

Plasticized sheet containing PVB is known as an impact-dissipating layer for use with glass in light-transmitting laminated safety panels for viewing window applications and the like.

The noted copending application discloses microscopically protruding particles of crosslinked PVB to roughen the surface of PVB sheet to facilitate deairing during formation of a laminate with glass.

SUMMARY OF THE INVENTION

Now improvements have been made in the performance of glass laminates containing the just-noted PVB sheet which are unrelated to the surface roughening disclosure of such copending application.

Accordingly, a principal object of this invention is to improve the impact strength of a safety glass laminate.

An additional object is to provide a method for achieving such improved safety glass laminate impact strength.

Other objects will in part be obvious and will in part appear from the following description and claims.

These and other objects are accomplished by a light-transmitting laminated panel having increased resistance to impact-induced rupture sequentially comprising: a) a glass layer, b) an optically clear layer comprising a plasticized polyvinyl butyral matrix containing discrete particles of crosslinked polyvinyl butyral integrally randomly dispersed throughout the matrix which enhance the impact-resistance of the panel and are visually indistinguishable from the matrix polyvinyl butyral, and c) another glass layer; said laminated panel at a specific pummel adhesion having greater mean break height than that of a aminated panel containing layers a), b) and c) but without the impact-resistance enhancing particles of crosslinked polyvinyl butyral in layer b).

Also provided is a method for improving the resistance to impact-induced rupture of a light-transmitting laminated panel of glass sheets bonded to a plasticized polyvinyl butyral interlayer which comprises incorporating an impact-improving amount of resilient crosslinked polyvinyl butyral particles into the interlayer before preparing the laminated panel.

BRIEF DESCRIPTION OF THE DRAWINGS

In describing the overall invention, reference will be made to the accompanying drawings wherein.

DETAILED DESCRIPTION OF THE INVENTION

Figure 1:
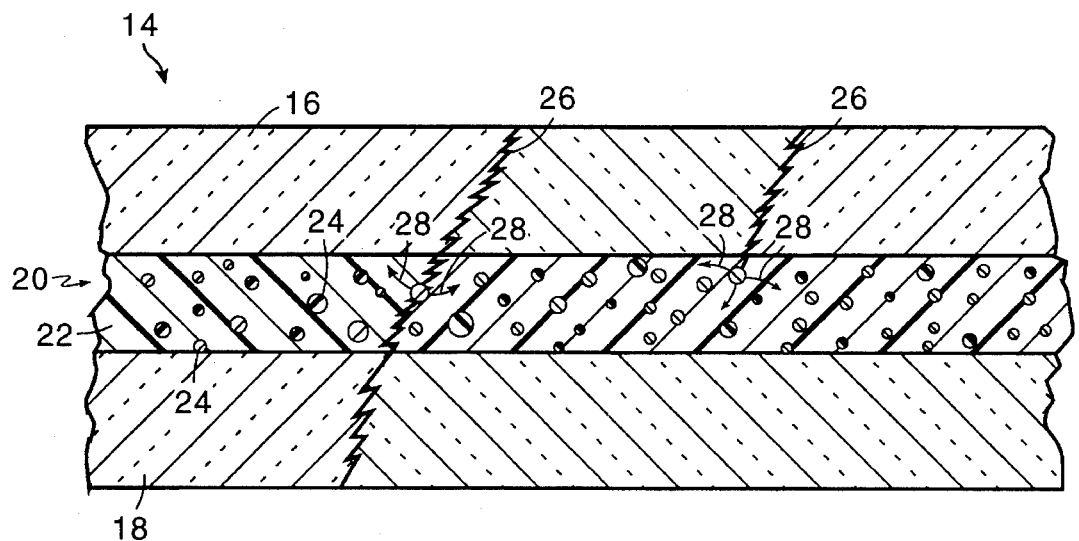
FIG. 1 is an enlarged, schematic, cross sectional view through a glass laminate according to the invention.

FIG. 1 depicts optically clear, plastic layer 20 in void-free, face-to-face bonded contact with 70 to 90 mil (1.8 to 2.3 mm thick) glass layers 16,18, which layers in combination form light-transmitting laminated panel 14 having increased resistance to impact-induced rupture. Plastic layer 20 throughout its thickness comprises plasticized polyvinyl butyral matrix phase 22 containing impact-resistance-enhancing discrete particles 24 of crosslinked PVB integrally randomly dispersed throughout matrix 22 which are visually indistinguishable from such PVB matrix. Relative to the dispersed phase, the matrix phase is uncrossinked or lightly crosslinked or a mixture of uncrosslinked and lightly crosslinked PVB. The dispersed PVB phase of particles 24 rheologically differs from matrix 22 in being more crosslinked and stiffly resilient in comparison with the matrix.

Before combining with glass layers 16, 18, layer 20 preferably is the planar sheet (not shown) subject of the aforesaid copending application wherein each of its major planar surfaces is rough, i.e. has a pattern of microscopic protrusions and associated valleys facilitating withdrawal of air from each interface of such sheet with a glass layer 16, 18. As described in such application, such protrusions are formed by crosslinked PVB particles embedded in and partially projecting from the sheet surface. Layer 20 in FIG. 1 is the flattened cross section of such sheet wherein initially projecting crosslinked PVB particles have been compressively forced into layer 20 during laminating so as not to project from the surface and join remaining particles 24 within the thickness of layer 20. Particles 24, i.e. those initially projecting from the surface as well as those embedded beneath the surface within the thickness, are incorporated into the sheet during its formation in a manner to be described. While projecting particles 24 (not shown) are disclosed in the copending application as functional during deairing, in this invention they enhance impact performance of panel 14 in a manner to be explained. The technique chosen to provide sheet surface roughness, therefore, is not critical in this invention. For example, instead of (or in addition to) relying on projecting PVB particles for surface roughness for deairing, other conventional techniques known to those skilled in the art may be used. These include controlling one or more of the following, usually in association with a sheet extrusion process: polymer molecular weight distribution, water content of the polymer melt, melt and die exit temperature, die exit geometry, etc.

Laminated panel 14 is formed in known manner by initially removing air from the interface of plastic layer 20 with glass layers 16, 18 by vacuum or pressure and then exposing layers 16, 18 and 20, arranged as shown in FIG. 1 to elevated temperature (about 143° C.) (290° F.) and pressure (about 1270 kPa) (185 psi) bonding conditions during a period on the order of 10 to 60 minutes.

Crosslinked, dispersed particles 24 are irregularly shaped but for simplicity are shown as circular in FIG. 1. The melt shear viscosity of the PVB of particles 24 is sufficient to preserve the integrity of the particles in the two phase heterogeneous mixture during melt shaping of the mixture into sheet form. Such melt shear viscosity (20 sec.$^{-1}$) is preferably at least three times (most preferably at least five times) greater than that of the matrix phase. This viscosity difference prevents the stiffly resilient particles from homogenizing with the matrix during melt processing, i.e. though in the molten state, the more crosslinked phase maintains its integrity during extrusion.

Particles 24 in a heterogeneous blend with matrix 22 in laminated panel 14 differ from PVB formulations of U.S. Pat. No. 4,654,179 wherein sheet formed entirely of matrix 22 and sheet formed entirely of the dispersed phase 24 is homogenous i.e. the dispersed particles are absent.

Crosslinked particles 24 randomly dispersed through the thickness of layer 20 unexpectedly increase the resistance of panel 14 to impact-induced rupture. More particularly, in terms of impact performance of a safety glass laminate, multiple cracks or fissures, schematically shown as 26 in FIG. 1, typically develop in a glass layer (e.g. 16) when, for example, struck by the head of an occupant of a motor vehicle containing panel 14 during an accident. In prior art laminates, when such crack reaches the interface with the unmodified encapsulated PVB layer, the glass locally detaches from the plastic to permit the impact energy to be absorbed by elongation of the plastic, with rupture occurring when its yield point is exceeded. This can be correlated with the height from which a ball is dropped in the Mean Break Height test described hereafter along with the level of adhesion between the glass and plastic measured according to the Pummel Adhesion test also described hereafter. In contrast, with the panel of FIG. 1, while not absolutely certain, it is postulated that instead of proceeding through the plastic to the glass layer on the other side, the impact stress is interrupted when it reaches a relatively high modulus particle 24 capable of resisting and stopping the fracture and/or redistributing the impact stress in multiple directions as illustrated by arrows 28 in FIG. 1. This redistribution allows matrix phase 22 to elongate more before yielding than would be the case in the absence of particles 24. While other phenomena may contribute to the observed improvement, this is tile mechanism thought responsible in large part for the increased resistance to impact-induced rupture of panel 14 as further described in Examples 6–8 following.

The laminated panel impact improvement of the invention is a function of tile size, stiffness and concentration of particles 24 in layer 20. Thus, more impact sites exist through the thickness of layer 20 (for a given size distribution and particle rigidity) as the concentration of disperse phase increases. The particles are present in a positive amount up to 40 weight % of the total weight of PVB in plastic layer 20. The preferred concentration is preferably 1 to 30, most preferably about 3 to about 20 weight % of such total weight. At a disperse phase concentration below 1 weight %, impact improvement should be unaffected; increasing such concentration above 40% gives a formulation too difficult and therefore uneconomical to melt process.

As the level of crosslinking (controlled by crosslinking agent concentration during synthesis of particles 24) increases, the size of the crosslinked particles is believed to increase. Generally, the size distribution of the dispersed phase particles is between 1 and 100 microns, preferably 1 to 50 microns. Particles greater than 100 microns may produce optical defects, i.e. hard spots (opaque discontinuities) visually apparent in laminated panel 14. Submicron particles do not provide adequate impact improvement.

Particle stiffness is also a function of the level of crosslinking of the particles of the dispersed phase and is measured by the concentration of crosslinking agent present during the synthesis reaction between polyvinyl alcohol (PVOH) and butyraldehdye forming the particles. Acceptable particle stiffness is obtained with a concentration of crosslinking agent during synthesis at least three times greater than used (if any) in forming the matrix phase. Such concentration is preferably 0.10 to 0.50, most preferably 0.20 to 0.40 parts crosslinking agent per 100 parts PVOH.

Unlaminated sheet before combination with glass layers 16, 18 appears milky white and opaque to the eye largely from light scattering from the protrusions forming the rough surface previously referred to. This surface roughness and opacity are eliminated in finished laminated panel 14 since during its preparation the PVB matrix melts and flows and particles are pressed into the thickness of layer 20. After laminating, an optically transparent, substantially haze-free panel 14 free of optical distortion (i.e. no distortion of image is noted when an object is looked at through the panel) is obtained. In panel 14, crosslinked particles in layer 20 are visually indistinguishable from and optically identical to the matrix PVB, since the refractive index of the particles is very closely matched with that of the matrix, typically varying only by ±0.0005 (or less) refractive index units. Either or both of the glass layers or the plastic layer may be tinted by coloring agents such as pigments or dyes without detracting from such optical transparency. Likewise, additional functional layers may optionally be included in panel 14 either of unmodified PVB, or PVB bulk modified with crosslinked particles, or of a material different from PVB such as a self-healing layer of polyurethane forming a laminated structure known in the art as a bilayer.

The heterogeneous PVB mixture for forming sheet used in the laminate of the invention is prepared by mechanically mixing the two phases, either in a dry state without melting followed by melt shaping of the mixture or by mixing the phases in a high intensity mixer where some melting occurs followed by melt extrusion.

The unlaminated rough-surfaced sheet has a non-critical thickness of about 5 to 60 mils (0.13 to 1.52 mm).

With respect to formation of crosslinked PVB, the chemical reaction of crosslinking agent(s) with PVOH to produce intermolecular cross linkages is disclosed in U.S. Pat. No. 4,654,179, col. 2, lines 20–48, the content of which is incorporated herein by reference. Any crosslinking agent (including mixtures of crosslinking agents) is usable which contains active groups capable of interacting with a pair of hydroxyl groups on each of two neighboring PVOH molecular chains to form stable intermolecular linkages. Operable crosslinking agents include diepoxides such as diglycidyl ether bisphenol A; aldehydes containing at least two CHO groups such as dialdehydes and trialdehydes and the like. PVB crosslinked by monobutyral bonds as disclosed in published Japanese Kokai 5-25213, laid open Feb. 2, 1993, may be used. Preferred crosslinking agents are dialdehydes, for example oxaldehyde and the more complex dialdehydes, and trialdehydes containing aliphatic (with or without unsaturation), aromatic or mixed aliphatic/aromatic groups between carbonyl linkages of the CHO groups. Specific functional dialdehydes include aliphatic aldehydes such as propanedial, succinaldehyde, adipaldehyde, 2-hydroxyhexanedial, etc.; aromatic dialdehydes including phthaldehyde, 1,4 benzenediacetaldehyde, 4,4-(ethylenedioxy) dibenzaldehyde, 2,6-napthathalene dicarbaldehyde, etc. Operable trialdehydes include N,N'N"-(3,3',3"-trisformylethyl) isocyanurate and the like. Mixtures of the foregoing and other crosslinking agents are also suitable. Preferred dialdehydes are selected from the group consisting of glutaraldehyde, 4,4' (ethylenedioxy) dibenzaldehyde and 2-hydroxyhexanedial. Glutaraldehyde is most preferred.

Crosslinking occurs substantially in conjunction with formation of PVB through condensation of PVOH with butyraldehyde. The concentration of crosslinking agent to provide crosslinked PVB varies with molecular weight of the crosslinking agent the higher such molecular weight the greater the amount required. For the preferred di and trialdehydes, the concentration used should be 0.10 to 0.50, preferably 0.20 to 0.40 parts per hundred parts PVOH. Crosslinked PVB resin is produced by known aqueous or solvent acetalization wherein PVOH is reacted with butyraldehyde in the presence of an acid catalyst to produce PVB, followed by neutralization of the catalyst, separation, stabilization and drying of the PVB resin. Depending on rate of reaction, the crosslinking agent is added to the catalyzed condensation reaction mixture before or simultaneously with the butyraldehyde. In a solvent system, the sequence of addition may be somewhat different; for example, it may be necessary to add the crosslinking agent after the PVB is in solution. Alternatively, in situ crosslinking of initially uncrosslinked PVB is also within the scope of the invention. For example, uncrosslinked PVB is made by the solvent process and then, with the uncrosslinked PVB in solution in the synthesis reaction vessel, a charge of acid catalyst and crosslinking agent (e.g. tetra ethyl ortho silane) at appropriate concentration is made to such reactor to crosslink the PVB resin contents. Crosslinked PVB particles 24 of layer 20 of panel 14 in FIG. 1 are made in this manner.

In a solvent process, acetalization is carried out in the presence of sufficient solvent to dissolve the PVB and produce a homogeneous solution at the end of acetalization. The PVB is separated from solution by precipitation of solid particles with water which are then washed and dried. Solvents used are lower aliphatic alcohols such as ethanol.

In an aqueous process, acetalization is carried out by adding butyraldehyde to a water solution of PVOH at a temperature on the order of about 20° C., in the presence of an acid catalyst, agitating the mixture to cause an intermediate PVB to precipitate in finely divided form and continuing the agitation while heating until the reaction mixture has proceeded to the desired end point.

In forming sheet, the PVB mixture is plasticized with from about 20 to 80 parts plasticizer per hundred parts of PVB, typically between 25 to 45 parts. This latter concentration is generally used with polyvinyl butyrals containing 17 to 25% vinyl alcohol by weight. In general, PVB plasticizers commonly employed are esters of a polybasic acid or a polydydric alcohol. Particularly suitable plasticizers are triethylene glycol di-(2-ethyl butyrate), dihexyl adipate, dioctyl adipate, mixtures of heptyl and nonyl adipates, dibutyl sebacate, polymer plasticizers such as the oil-modified sebacid alkyds, and mixtures of phosphates and adipates such as disclosed in U.S. Pat. No. 3,841,890 and adipates and alkyl benzyl phthalates such as disclosed in U.S. Pat. No. 4,144,217. Also usable are the mixtures disclosed in U.S. Pat. No. 5,013,780. Other suitable plasticizers are well known or will be obvious to those skilled in the art. Plasticizer amount absorbed by the dispersed phase may vary with crosslink level and the time, intensity and temperature of mixing.

The sheet is prepared using systems known to those skilled in the art, e.g. by extrusion through a conventional sheeting die, preferably having surface-cooled die lips. More particularly the premixed heterogeneous blend as molten polymer fluid (at a temperature of about 175° to 215° C.) is forced through a horizontally long, vertically narrow die opening substantially conforming in length and width to that of the sheet being formed. Alternatively, instead of batch premixing of the two PVB components, the matrix and dispersed phases may be separately charged to a mixing extruder and processed into sheet as just described. An extrusion system employing a die roll to form the sheet is also usable, i.e. the polymer is cast onto a specially prepared surface of a die roll positioned in close proximity to the exit of such die or forming a surface of such die, such as shown in FIGS. 5 and 6 of U.S. Pat. No. 4,112,166 and further described therein.

In addition to plasticizers, the sheet may contain other additives such as ultraviolet light stabilizers, salts to control adhesion, antioxidants and may, if desired, be treated with additives to improve laminating efficiency. The sheet may optionally have a colored anti-glare PVB gradient band along one side adjacent its edge which may be incorporated into the sheet using the system disclosed in U.S. Pat. No. 4,316,868, the content of which is incorporated herein by reference.

The invention is further described in the following examples which are for illustration only and are not intended to imply any limitation or restriction on the invention. Unless otherwise indicated, all quantities are expressed by weight. In such examples the properties reported are measured substantially in accordance with the following procedures.

Melt shear viscosity (at 20 sec.$^{-1}$) is measured using a capillary extrusion rheometer, Instron Model #4208, capillary length =1.246 in. (13.16 cm), diameter =0.025 in. (0.064 cm), entrance angle =90°.

Mean Break Height (MBH) −30.5×20.5 cm ×0.76 mm glass laminates prepared using the laminating conditions recited above are horizontally individually positioned in a support frame. While at a constant 21° C. laminate temperature, a 2.27 kg spherical ball is dropped from a designated height onto the center of the laminate. Two spaced magnetic coils are beneath the test laminate. After penetrating a laminate, the ball sequentially passes through the magnetic fields of the coils and as these fields are disturbed, the top coil triggers a timer "on" switch while the bottom coil turns it off. Knowing the time to traverse the distance between coils permits calculating ball velocity. This residual ball velocity is related to energy absorbed by the laminate and absorbed energy in miles per hour (mph) relates to Mean Break Height. Measured MBH is the average of multiple ball drops from different heights.

Pummel Adhesion measures plastic sheet adhesion to glass. Glass laminates prepared as recited above for MBH measurement are conditioned to −17° C. and manually pummeled with a 1 pound (454 g) hammer to break the glass. All broken glass unadhered to the PVB layer is removed. The amount of glass left adhered is visually compared with a set of standards 0f known pummel scale, the higher the number of the standard, the more glass remaining adhered to the PVB layer—i.e. at a pummel of zero, no glass is left whereas at a pummel of 10, 100% of the PVB layer surface is adhered to the glass. Pummel adhesion value has no units. Desirable impact dissipation occurs at a pummel adhesion value between 3 to 8. At less than 3 too much glass is lost whereas at more than 8 adhesion is generally too high and impact absorption poor.

EXAMPLES 1–2

Preparation of Crosslinked PVB Resin

Polyvinyl alcohol (PVOH) resin having a residual polyvinyl acetate content of less than 2% is dissolved with agitation in water at 90°–95° C. to form an 8% solution. 5524 Kg of this PVOH solution is charged to an agitated reactor and its temperature adjusted to 18° C. To this solution is added 267 kg of butyraldehyde and various amounts (See Table 1 following) of a 50% aqueous solution of glutaraldehyde which decreases the temperature to about 16° C. 16 kg of a 35% water solution of nitric acid is then charged and the mixture held for 1.25 hr. at between 16° and 20° C. A second charge of 46.5 kg of nitric acid is added 1 hr after the initial nitric acid charge. After 1.25 hr. the mixture is heated over 2 hr. to 75° C. and held there for 2.5 hr. The contents of the reactor is washed with water at 75° C to a pH of 4.0. Potassium hydroxide water solution is then charged to provide a pH of 9.5–10.5 and the contents held at this pH for 3 hr at 75° C. Additional water at 75° C. is then added to decrease the pH to 7.5. The PVB slurry is centrifuged and dried to less than 2% moisture. The melt shear viscosity of the PVB resin plasticized with 32 parts dihexyl adipate per 100 parts resin is measured at 204° C. and the following results obtained:

TABLE 1

| Ex. | Glutaraldehyde wt/per cwt of PVOH | PVB Melt Shear Viscosity (Pa.s) 20 sec$^{-1}$ |
|---|---|---|
| 1 | 0.02 (Matrix Phase) | 1339 |
| 2 | 0.3 | 7184 |

The increase in melt shear viscosity shows stiffening of the resin has increased from crosslinking using glutaraldehyde. The crosslinked PVB particles are estimated at about 20 microns nominal diameter based on optical and scanning election microscopy data.

EXAMPLES 3–8

Preparation of Sheet and Glass Laminates

Using a high intensity mixer, 32 parts dihexyl adipate are mixed with PVB resin. The plasticized formulations are then melted in an extruder and forced in melt form through a sheeting die having a rectangular die opening at its forward end delimited by a pair of opposing die lips, the surfaces of which (by internal circulation of a temperature control fluid) are maintained at 95°–105° C. The melt is at about 198° C. and pressure at the die opening is 887–1119 psi (611–7710 kPa). Extruded sheet thickness is about 30 mils (0.76 mm) and it issues from the die at about 3.7 fpm (1.1 mpm). Each side of the sheet has a rough surface characterized by an $R_z$ value of 18.4 microns (Exs. 3–5) and 43.4 microns (Exs. 6–8) measured using a model S8P Perthometer from Mahr Corporation, Cincinnati, Ohio. Sections of sheet are interposed between glass layers (90 mils thick), and air removed from the interfaces by twice passing through a pair of cooperating nip rolls while lightly heating the glass/plastic/glass assemblies after the first pass to about 105° C.

Laminated panels (3 ply-glass/PVB layer/glass) are then prepared by exposing the deaired assemblies to 143° C. and 1270 kPa pressure for 20 min. Actual PVB layer thickness in a laminated panel is carefully measured and the pummel adhesion test performed on the laminated panel; the data obtained is used in a correction equation to provide a corrected impact value vis-a-vis that which would have been obtained if the PVB layer were considered to be 30 mils (0.76 mm) thick. The correction equation is developed from actual experimental data of varying sheet thicknesses and pummel adhesion. Corrected pummel adhesion and MBH results for the laminates are presented in FIG. 2 and Table 2 following. In such Table 2, Exs. 3, 4 and 5 are controls in that the sheet is formed using 100 parts of the matrix PVB resin of Ex. 1 (0.02 pph glutaraldehyde) whereas Exs. 6, 7 and 8 are according to the invention wherein the sheet is formed using 90 parts of the Ex. 1 resin and 10 parts of the Ex. 2 resin (0.3 pph glutaraldehyde).

TABLE 2

| | Impact Strength | | |
|---|---|---|---|
| Example | (MBH, Ft.) | (m) | Pummel Adhesion |
| 3 | 13.3 | 4.1 | 7.7 |
| 4 | 17.3 | 5.3 | 6.4 |
| 5 | 25 | 7.6 | 3.7 |
| 6 | 15.0 | 4.6 | 7.7 |
| 7 | 22.7 | 6.9 | 6.4 |
| 8 | 26.3 | 8.0 | 3.7 |

Figure 2:
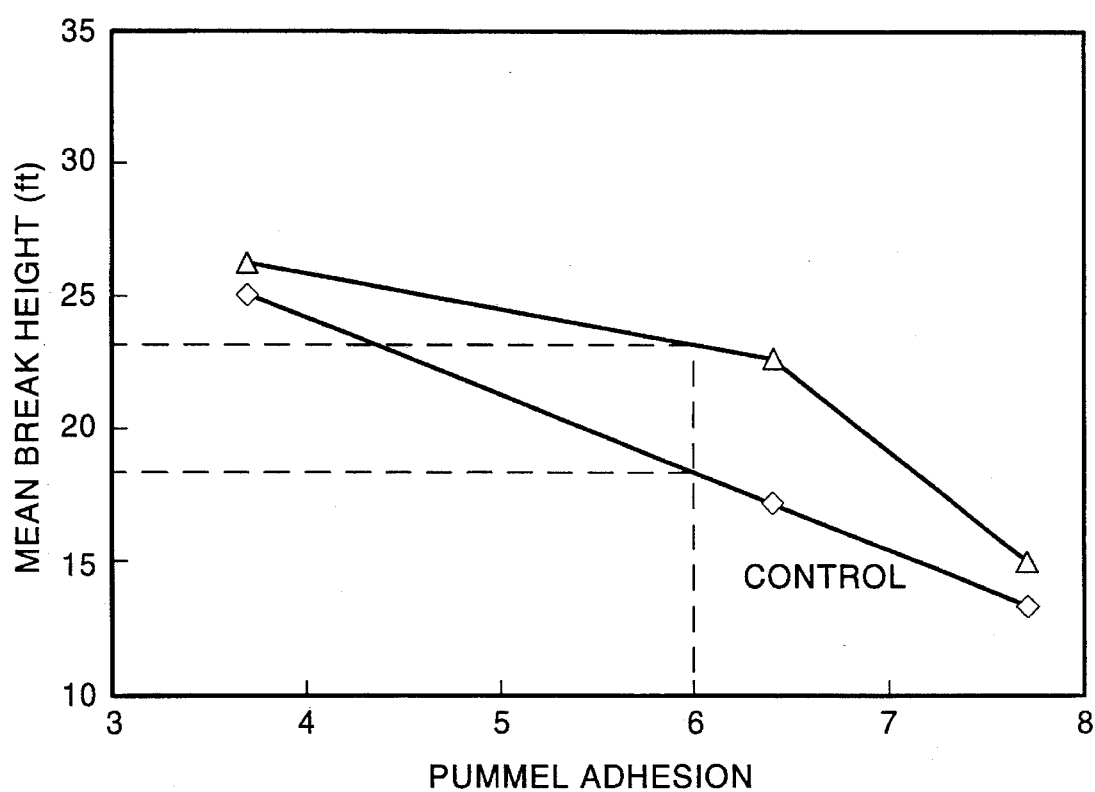
FIG. 2 is a graph illustrating the improved impact strength of laminates of the invention.

The MBH data for the invention panels of the upper graph in FIG. 2 (i.e. Exs. 6, 7, 8 in Table 2) is surprising. As previously mentioned, the magnitude of adhesion between glass and plastic layers must be within a predetermined range for the laminate to function on impact in the intended manner. As shown in FIG. 2, MBH of the invention panels is greater than the control at the same pummel adhesion levels. Thus, at a pummel adhesion of 6, the impact strength of the invention laminate (upper curve) averages about 23 ft. (7 m) in comparison with a value of about 18 for the control, i.e. a 28% improvement. This means the invention laminate (e.g. in the form of a windshield) has considerably higher resistance to impact with little or no change in adhesion performance at the same plastic layer thickness in the laminate as that for the prior art control. Alternatively, according to the invention, it should be possible to achieve impact strength equivalent to that of the control but at a valuable significant reduction in plastic layer thickness— i.e. the invention curve in FIG. 2 should move downwardly toward the control at reduced plastic layer thickness. Such reduced thickness will reduce plastic layer cost. A corollary to the illustrated impact improvement is that laminates according to the invention can achieve satisfactory impact levels at higher pummel values than standard control laminates. For example, for an MBH of 20 ft (6 m), from FIG. 2 tile pummel for a standard control laminate should be about 5.5. According to the invention the same 20 ft (6 m) MBH can be achieved at a pummel of about 7, or considered somewhat differently, the MBH at a pummel of 5.5 will be about 24 ft (7.3 m). Greater adhesion to glass is desirable in a laminate to reduce the possibility of delaminating (e.g. from a windshield being struck from the exterior by a foreign object) as is the attendant result of the glass shattering and flying about. Greater adhesion also desirably leads to improved edge stability, i.e. reduced tendency to delaminate along the laminate edge which has been a problem in the past. Moreover, satisfactory impact performance over greater adhesion (pummel) range means the plastic layer is more "forgiving" since factors normally affecting adhesion, such as moisture, and concentration of adhesion control agents need not be as closely controlled as with the standard control layer. This is industrially important insofar as providing a greater margin for manufacturing to provide quality sheet to satisfy a minimum impact specification over a broader adhesion range.

The preceding description is for illustration only and is not to be taken in a limited sense. Various modifications and alterations will be readily suggested to persons skilled in the art. It is intended, therefore, that the foregoing be considered as exemplary only and that the scope of the invention be ascertained from the following claims.

We claim:

1. A light-transmitting laminated panel having increased resistance to impact-induced rupture sequentially comprising:
   a) a glass layer;
   b) an optically clear layer comprising a plasticized polyvinyl butyral matrix containing discrete particles of crosslinked polyvinyl butyral integrally randomly dispersed throughout the matrix in sufficient quantity to enhance the impact-resistance of the panel and which in size are visually indistinguishable from the matrix polyvinyl butyral;
   c) another glass layer;
   said laminated panel at a specific pummel adhesion having greater mean break height than that of a laminated panel containing layers a), b) and c) but without the impact-resistant enhancing particles of crosslinked polyvinyl butyral in layer b).

2. The panel of claim 1 wherein the particles of crosslinked polyvinyl butyral are present in an amount up to 40 weight % based on the weight of matrix and crosslinked particles.

3. The panel of claim 1 wherein the particles in size are from 1 to 100 microns.

4. The panel of claim 3 wherein the extent of crosslinking of the polyvinyl butyral particles is defined by the concentration of crosslinking agent present during a reaction between polyvinyl alcohol and butyraldehyde forming such particles, such concentration being from about 0.10 to 0.50 parts crosslinking agent per 100 parts polyvinyl alcohol.

5. The panel of claim 4 wherein the particles of crosslinked polyvinyl butyral have a melt shear viscosity at 20 sec.$^{-1}$ at least three times greater than that of the matrix.

6. The panel of claim 5 wherein the crosslinking agent is glutaraldehyde.

7. A method for improving the resistance to impact-induced rupture of a light-transmitting laminated panel of glass sheets bonded to a plasticized polyvinyl butyral interlayer which comprises incorporating into the interlayer before preparing the laminated panel an impact improving amount of resilient crosslinked polyvinyl butyral particles having a refractive index essentially matching the refractive index of the polyvinyl butyral of the interlayer.

8. The method of claim 7 wherein the amount of crosslinked particles is up to 40 weight % based on the weight of polyvinyl butyral and crosslinked particles.

9. The method of claim 8 wherein the particles have a melt shear viscosity at 20 sec.$^{-1}$ at least three times greater than that of the polyvinyl butyral.

10. The method of claim 9 wherein the crosslinking agent is glutaraldehyde.

* * * * *